(12) United States Patent
Delfino et al.

(10) Patent No.: US 8,962,120 B2
(45) Date of Patent: Feb. 24, 2015

(54) NON-PNEUMATIC RESILIENT TIRE

(75) Inventors: Antonio Delfino, Grolley (CH); Richard Herault, Genas (FR); Denis Martin, Villars sur Glane (CH); Jean-Paul Meraldi, Zurich (CH)

(73) Assignees: Michelin Recherche et Technique S.A., Granges-Paccot (CH); Compagnie Generale des Etablissements Michelin, Clemont-Ferrand (FR)

( * ) Notice: Subject to any disclaimer, the term of this patent is extended or adjusted under 35 U.S.C. 154(b) by 648 days.

(21) Appl. No.: 12/933,673

(22) PCT Filed: Mar. 16, 2009

(86) PCT No.: PCT/EP2009/001885
§ 371 (c)(1),
(2), (4) Date: Dec. 8, 2010

(87) PCT Pub. No.: WO2009/135561
PCT Pub. Date: Nov. 12, 2009

(65) Prior Publication Data
US 2011/0260525 A1   Oct. 27, 2011

(30) Foreign Application Priority Data
Mar. 19, 2008   (FR) ...................................... 08 51758

(51) Int. Cl.
*B60B 9/02*   (2006.01)
*B60B 9/26*   (2006.01)
*B60C 7/18*   (2006.01)

(52) U.S. Cl.
CPC ... *B60B 9/02* (2013.01); *B60B 9/26* (2013.01); *B60C 7/18* (2013.01)
USPC .......................................... 428/66.6; 152/43

(58) Field of Classification Search
CPC ....................................................... B60B 9/02
USPC ......... 428/66.6, 114; 152/43, 42, 40, 5, 7, 17, 152/72, 84, 253
See application file for complete search history.

(56) References Cited

U.S. PATENT DOCUMENTS

| 124,929 A | 3/1872 | Beitel |
| 159,385 A | 2/1875 | Brosius |

(Continued)

FOREIGN PATENT DOCUMENTS

| DE | 75467 | 12/1892 |
| DE | 20207473 | 8/2002 |

(Continued)

OTHER PUBLICATIONS

T. B. Rhyne and S. M. Cron "Development of a Non-Pneumatic Wheel" Tire Science and Technology, TSTCA, vol. 34, No. 3, Jul.-Sep. 2006, pp. 150-169.

*Primary Examiner* — Alexander Thomas
(74) *Attorney, Agent, or Firm* — Cozen O'Connor

(57) ABSTRACT

Non-pneumatic resilient wheel (10), that is supported structurally and defines three perpendicular directions, circumferential (X), axial (Y) and radial (Z). The wheel comprises a hub (11); an annular band referred to a shear band (13) comprising at least one inner circumferential membrane (14) and one outer circumferential membrane (16) that are oriented in the circumferential direction X; and a plurality of support elements (12) that connect the hub (11) to the inner circumferential membrane (14). The two membranes (14, 16) are connected to one another, in zones (17) referred to as anchoring zones, by means of a series (15A, 15B, 15C), that extends in the circumferential direction (X), of cylinder structures (15) referred to as connecting cylindrical structures that are non-touching in the circumferential direction X. Each connecting cylindrical structure (15) comprises a plurality of elementary cylinders (15*a*, 15*b*) having their generatrix oriented along the axial direction Y, said elementary cylinders being fitted one inside the other and interconnected to one another in each anchoring zone (17).

11 Claims, 4 Drawing Sheets

(56) References Cited

U.S. PATENT DOCUMENTS

| | | | |
|---|---|---|---|
| 739,053 | A | 9/1903 | Biava |
| 772,239 | A | 10/1904 | Keil |
| 891,169 | A | 6/1908 | Hilger |
| 1,002,003 | A | 8/1911 | Simonson et al. |
| 1,101,702 | A | 6/1914 | Henry |
| 1,126,631 | A | 1/1915 | Haeppner |
| 1,233,722 | A | 7/1917 | Smith |
| 1,337,445 | A | 4/1920 | Drabek |
| 1,388,820 | A | 8/1921 | Nucera |
| 1,451,517 | A | 4/1923 | Smith |
| 1,680,961 | A * | 8/1928 | Van Putten et al. ............ 152/177 |
| 2,206,230 | A | 7/1940 | Ogdin |
| 2,400,047 | A * | 5/1946 | Itscovich ..................... 152/311 |
| 3,439,027 | A | 4/1969 | Patton et al. |
| 3,493,027 | A | 2/1970 | Dewhirst et al. |
| 3,598,275 | A | 8/1971 | Francois |
| 3,771,592 | A | 11/1973 | Sayers |
| 4,167,598 | A | 9/1979 | Logan et al. |
| 4,471,827 | A | 9/1984 | Czapar |
| 4,558,727 | A * | 12/1985 | Golata et al. ..................... 152/5 |
| 5,118,555 | A | 6/1992 | Horovitz |
| 5,343,916 | A | 9/1994 | Duddey et al. |
| 5,547,737 | A | 8/1996 | Evans et al. |
| 5,800,643 | A | 9/1998 | Frankowski |
| 5,888,608 | A | 3/1999 | Tsai |
| 7,143,564 | B2 | 12/2006 | Renck |
| 8,491,981 | B2 * | 7/2013 | Delfino et al. ................. 428/113 |
| 8,517,068 | B2 * | 8/2013 | Delfino et al. ..................... 152/5 |
| 2002/0007022 | A1 | 1/2002 | Oosedo et al. |
| 2002/0124929 | A1 | 9/2002 | Rhyne et al. |
| 2004/0012246 | A1 | 1/2004 | Rhyne et al. |
| 2004/0069385 | A1 | 4/2004 | Timoney et al. |
| 2004/0159385 | A1 | 8/2004 | Rhyne et al. |
| 2008/0241443 | A1 | 10/2008 | Liu et al. |
| 2010/0193097 | A1 | 8/2010 | McNier et al. |
| 2010/0307653 | A1 | 12/2010 | Delfino et al. |

FOREIGN PATENT DOCUMENTS

| | | |
|---|---|---|
| EP | 1 359 028 | 11/2003 |
| EP | 1 378 377 | 1/2004 |
| FR | 581827 | 12/1924 |
| FR | 2 271 044 | 12/1975 |
| FR | 2 297 144 | 8/1976 |
| FR | 2 921 011 | 3/2009 |
| GB | 1912 2172 | 0/1913 |
| GB | 857439 | 12/1960 |
| GB | 2 177 355 | 1/1987 |
| JP | 5-077605 | 3/1993 |
| JP | 39-23073 | 5/2007 |
| JP | 2007-112243 | 5/2007 |
| KR | 1998-084921 | 12/1998 |
| WO | WO 2007/137858 | 12/2007 |
| WO | WO 2009/005945 | 1/2009 |
| WO | WO 2009/115254 | 9/2009 |

\* cited by examiner

NON-PNEUMATIC RESILIENT TIRE

RELATED APPLICATIONS

This is a U.S. national stage of application No. PCT/EP2009/001885, filed on Mar. 16, 2009.

This patent application claims the priority of French patent application no. 08/51758 filed Mar. 19, 2008, the disclosure content of which is hereby incorporated by reference.

FIELD OF THE INVENTION

The present invention relates to laminated products, that is to say to products made of several layers or bands of planar or non-planar form, which are joined together, for example of the cellular or honeycomb type.

The invention relates more particularly to resilient (flexible) wheels for motor vehicles of the "non-pneumatic" type: that is to say that do not require inflation gases such as air in order to assume their usable form, and to the incorporation in such wheels of laminated products, in particular when these laminated products are composite products, all or part of which is constituted of fibres coated in a resin matrix.

BACKGROUND OF THE INVENTION

Non-pneumatic flexible wheels or tyres are well known to a person skilled in the art. They have been described in a great number of patent documents, for example in patents or patent applications EP 1 242 254 (or U.S. Pat. No. 6,769,465), EP 1 359 028 (or U.S. Pat. No. 6,994,135), EP 1 242 254 (or U.S. Pat. No. 6,769,465), U.S. Pat. No. 7,201,194, WO 00/37269 (or U.S. Pat. No. 6,640,859), WO 20071085414.

Such non-pneumatic tyres, when they are associated with any rigid mechanical element intended to provide the connection between the flexible tyre and the hub of a wheel, replace the assembly constituted by the pneumatic tyre, the rim and the disc such as are known on most current road vehicles.

In particular, the aforementioned U.S. Pat. No. 7,201,194 describes a non-pneumatic, structurally supported (without internal pressure) tyre, which has the main feature of including a reinforced annular band that supports the load on the tyre and a plurality of support elements or spokes, having very low stiffness in compression, which operate in tension to transmit the forces between the annular band and the wheel hub.

This annular band (or shear band) comprises two membranes, formed from essentially inextensible cords that are coated with natural or synthetic rubber, which membranes are separated by a shear layer that is itself made of rubber. The operating principle of such a band is that the shear modulus of the shear layer is very substantially lower than the tensile modulus of the two membranes, while being sufficient to be able to correctly transmit the forces from one membrane to the other and to thus make said band work in shear mode.

By virtue of this annular band, it is possible to manufacture non-pneumatic wheels or tyres capable of running in severe or harsh conditions without any risk of puncture and without the drawback of having to maintain an air pressure inside the tyre.

Moreover, compared with the non-pneumatic tyres of the prior art, a ground contact pressure which is more uniformly distributed, hence better working of the tyre, an improved road holding and improved wear resistance are obtained here.

However, such a rubber shear band is not without drawbacks.

Firstly, at the customary operating temperatures, for example between −30° C. and +40° C., it is relatively hysteretic, that is to say that some of the energy supplied for rolling is dissipated (lost) in the form of heat. Next, for significantly lower operating temperatures, such as those that can be found, for example in geographical areas of polar type, typically below −50° C. or even less, it is well known that rubber rapidly becomes brittle, frangible and therefore unusable. Under such extreme conditions, it is moreover understood that temperature fluctuations that are more or less sizable and rapid, combined, for example, with relatively high mechanical stresses, could also lead to adhesion problems between the two membranes and the shear layer, with a risk of localized buckling of the shear band level with the membranes and endurance that is in the end degraded.

SUMMARY OF THE INVENTION

During their research, the Applicants have found a non-pneumatic resilient wheel, preferably based on a composite material, which makes it possible to at least partly overcome the aforementioned drawbacks.

A first aspect of the present invention relates (with reference to the appended FIG. 1) to a non-pneumatic resilient wheel (10), that defines three perpendicular directions, circumferential (X), axial (Y) and radial (Z), said wheel comprising at least:
  a hub (11);
  an annular band referred to a shear band (13) comprising at least one inner circumferential membrane (14) and one outer circumferential membrane (16) that are oriented in the circumferential direction X; and
  a plurality of support elements (12) that connect the hub (11) to the inner circumferential membrane (14),
and being characterized in that:
  the two membranes (14, 16) are connected to one another in zones (17) referred to anchoring zones by means of a series (15A, 15B, 15C), that extends in the circumferential direction (X), of cylindrical structures (15) referred to connecting cylindrical structures that are non-touching in the direction X; and
  each connecting cylindrical structure (15) comprises a plurality of elementary cylinders (15a, 15b), which are preferably concentric, having their generatrix oriented along the axial direction Y, said elementary cylinders being fitted one inside the other and interconnected to one another in each anchoring zone (17a, 17b).

This non-pneumatic resilient wheel of the invention has a highly aerated deformable cellular structure, which has proved to exhibit, unexpectedly, a high resistance to flexural and/or compressive stresses and a high endurance to such repeated or alternated stresses. It has the advantage of being non-hysteretic.

According to one preferred embodiment of the invention, the elementary cylinders, components of the connecting cylindrical structures, are composite cylinders comprising fibres embedded in a resin matrix.

Moreover, according to one particularly preferred embodiment, when the complete annular shear band (that is to say the two membranes and the elementary cylinders) is constituted of a composite material based on fibres (in particular glass fibres and/or carbon fibres) that are embedded in a thermosetting resin of polyester or vinyl ester type, this wheel has furthermore proved, not only capable of withstanding extremely low temperatures but also capable of being used in a very wide range of temperatures typically extending from −250° C. up to +150° C.

BRIEF DESCRIPTION OF THE DRAWINGS

The invention, and also its advantages, will be easily understood in light of the detailed description and exemplary embodiments that follow, and also figures relating to these examples which schematically show (without keeping to a specific scale):
in radial section, an example of a resilient wheel according to the invention (FIG. 1);
in cross section, a portion of the annular shear band of the wheel from FIG. 1 (FIG. 2);
a perspective view of the cross section of the preceding FIG. 2, shown flat for simplification (FIG. 3);
in radial section, another example of a non-pneumatic resilient wheel according to the invention (FIG. 4);
a complete perspective view of another example of a non-pneumatic resilient wheel

DEFINITIONS

Figure 1:
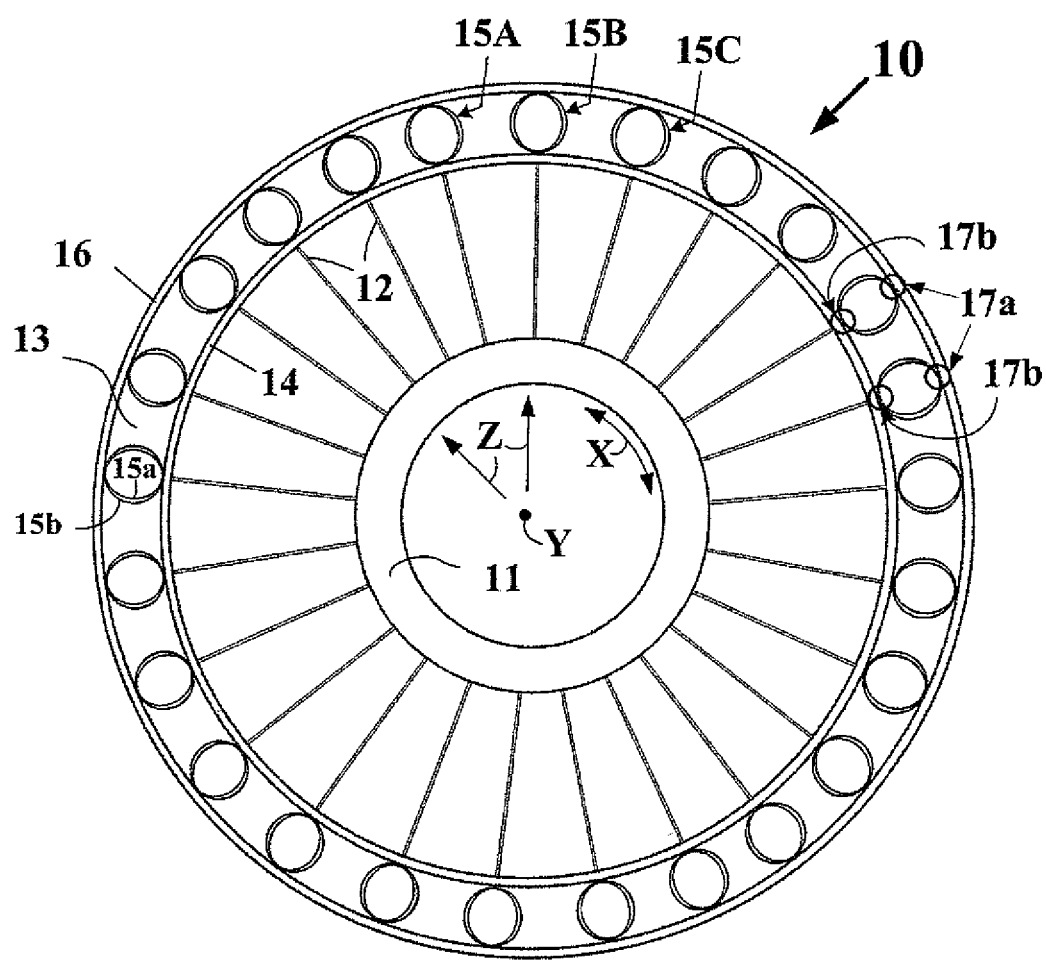

In the present description, unless otherwise stated, all the percentages (%) indicated are % by weight.
Moreover, in the present application, the following definitions apply:
"composite", when referring to any material or object: a material or object comprising short or continuous fibres that are coated in a resin matrix;
"layer" or "band": a sheet or any other element having a relatively small thickness compared to its other dimensions, this layer possibly or possibly not being of homogenous or cohesive nature;
"cylinder": any hollow (i.e. bottomless) cylinder in the broadest sense of the term, that is to say any object of cylindrical shape having any straight (orthonormal) cross section, that is to say the outline of which defines a closed line without a point of inflexion (the case, for example, for a circular, oval or elliptical cross section) or with point(s) of inflexion; according to such a definition, it will be understood that the terms such as tube, cylindrical tube, cylindrical tube portion, tubular element, tubular column, cylindrical element all denote said "cylinder";
"unidirectional fibres": a set of fibres that are essentially parallel to one another, that is to say oriented along one and the same axis;
"non-pneumatic", when referring to a wheel or a tyre: a wheel or a tyre designed in order to be capable of bearing a substantial load without inflation pressure, that is to say that does not require an inflation gas such as air in order to assume its usable form and support the load;
"oriented along an axis or in a direction" when referring to any element such as a band, a fibre or other longilineal reinforcing element: an element that is oriented substantially parallel to this axis or this direction, that is to say that makes, with this axis or this direction, an angle that does not deviate by more than ten degrees (therefore zero or at most equal to 10 degrees), preferably not by more than five degrees;
"oriented perpendicular to an axis or a direction", when referring to any element such as a band, a fibre or another longilineal reinforcing element: an element which is oriented substantially perpendicular to this axis or this direction, that is to say that makes, with a line that is perpendicular to this axis or this direction, an angle that does not deviate by more than ten degrees, preferably not by more than five degrees;
"oriented radially", when referring to a wheel (or tyre) element: oriented in any direction that passes through the axis of rotation of the wheel (or of the tyre) and substantially perpendicular to this direction, that is to say that makes, with a perpendicular to this direction, an angle that does not deviate by more than ten degrees, preferably not more than five degrees;
"oriented circumferentially", when referring to a wheel (or tyre) element: oriented substantially parallel to the circumferential direction of the wheel (or of the tyre), that is to say that makes, with this direction, an angle that does not deviate by more than ten degrees, preferably by not more than five degrees;
"laminated product", within the meaning of the International Patent Classification: any product comprising at least two layers or bands, of planar or non-planar form, which are connected together; the expression "joined" or "connected" should be interpreted in a broad manner so as to include all the joining or assembling means, for example by bonding, nailing, riveting or bolting;
"resin": any synthetic resin, of thermoplastic type or of thermosetting type (also referred to, for the latter, as curable, polymerizable or crosslinkable), and by extension any composition or formulation based on said resin and comprising, in addition, one or more additives such as, for example, a curing agent.

DETAILED DESCRIPTION OF THE DRAWINGS

By way of example, FIG. 1 represents, very schematically, a radial cross section (i.e. in a plane perpendicular to the axis of rotation Y of the wheel) of a non-pneumatic resilient wheel (10) that is structurally supported (i.e. owing to a load-bearing structure), the circumferential shear band (13) of which is constituted by a laminated product.

This wheel according to the invention, that defines three perpendicular directions, circumferential (X), axial (Y) and radial (Z), comprises at least:
a hub (11);
an annular band referred to a shear band (13) comprising at least one inner circumferential membrane (14) and one outer circumferential membrane (16) that are oriented in the circumferential direction X; and
a plurality of support elements (12) or "wheel spokes" that connect the hub (11) to the inner circumferential membrane (14),
and it is characterized in that
the two membranes (14, 16) are connected to one another, in zones (17) referred to anchoring zones, by means of a series (15A, 15B, 15C, etc.), that extends in the circumferential direction X, of cylindrical structures (15) referred to connecting cylindrical structures that are non-touching in the direction X; and
each connecting cylindrical structure (15) also comprises a plurality of (i.e. at least two) elementary cylinders (15a, 15b), which are preferably concentric, having their generatrix oriented along the axial direction Y, said elementary cylinders being fitted one inside the other and interconnected (attached) to one another in each anchoring zone (17a, 17b) at said inner membrane (14) and outer membrane (16).

In other words, the axis (generatrix) of the elementary cylinders is aligned parallel to the axis Y of rotation of the wheel, at the very least in the undeformed structure of the wheel (at rest).

Outside of the two anchoring zones (outer zone 17a, inner zone 17b) of each connecting cylindrical structure, zones which may also be referred to as "fixing zones" or "connection zones", where each connecting cylindrical structure is anchored, is connected, directly or indirectly, to the two membranes of the shear band, the elementary cylinders (i.e. 15a, 15b, etc.) that are components of each connecting cylindrical structure (15A, 15B, 15C, etc.), with or without clearance between them, "operate" independently of one another.

A person skilled in the art, on reading the present application, will readily understand that, at rest, the elementary cylinders may or may not be in contact with one another, but that, in normal operation, outside of said anchoring zones, these elementary cylinders are preferably not connected, not attached to one another so that they can function in an optimal manner, that is to say independently of one another (in the case of two elementary cylinders) or of each other (in the case of more than two elementary cylinders).

The use of several (i.e. two or more than two, for example three or four) stacked, in particular concentric, elementary cylinders, rather than a single cylinder, advantageously makes it possible, for a same stiffness of the shear band, to limit the stresses in the connecting cylindrical structure and to thus increase the allowable displacement of the assembly.

The elementary cylinders (15a, 15b, etc.) may be of different thickness from one to the next, they preferably have a more or less pronounced ovoid shape in order to optimize (increase) the contact area of said cylinders, particularly that of the outermost cylinder (15a), with the two membranes (14, 16) in the respective anchoring zones (17a, 17b).

In the case, for example, of two elementary cylinders (15a, 15b) per connecting cylindrical structure, as illustrated for example in FIG. 1, it will be understood that the outer diameter (i.e., dimension along the axis Z) of the inner elementary cylinder (15b) is less than or at most equal to the inner diameter (dimension along Z) of the outer elementary cylinder (15a) (the one closest to the inner and outer membranes, generally substantially tangent to the latter membranes).

It is preferred for the various elementary cylinders fitted one inside the other to have a diameter (dimension along the axis Z) that is as close as possible from one cylinder to the next, in order to optimize the overall endurance of the assembly forming the connecting cylindrical structure, and finally that of the wheel of the invention.

The shear band (13) of the non-pneumatic resilient wheel of the invention thus forms a hollow, very honeycombed structure that may be described as "cellular" in the sense that no other material is necessary (as illustrated for example in FIGS. 2 and 3) between the two membranes and the connecting cylindrical structures (formed of hollow and bottomless cylinders, by definition).

This deformable cellular structure, used as a non-planar elastic beam has proved to exhibit, unexpectedly, a high resistance to flexural/compressive stresses and a high endurance to such repeated or alternated stresses, by virtue of its ability to generate a deformation comparable to shear between its two membranes under the action of various tensile, flexural or compressive stresses.

In the above annular shear band, the two membranes and the connecting cylindrical structures may be constituted of various materials such as metals (for example titanium, steel, aluminium, metal alloys), polymers or composite materials.

The annular shear band may also be of hybrid nature, that is to say constituted of different materials combined.

However, according to one preferred embodiment of the invention, the elementary cylinders are cylinders made of a composite material, that is to say comprising fibres embedded in (or coated with, the two being considered to be synonyms) a resin matrix; more particularly, it is both the elementary cylinders and the two membranes which are made of a composite material.

Owing to connecting cylindrical structures preferably made of a composite material, the annular shear band has a high deformation potential in a purely elastic domain. Such connecting cylindrical structures made of a composite material are particularly durable as they exhibit a purely elastic behaviour up to rupture, without plastic deformation, contrary to, for example, a metallic structure which could experience, under very high deformation, plastic behaviour, i.e. irreversible behaviour, that is damaging, in a known manner, to the endurance. This advantageous property also applies of course to the membranes (14, 16) when the latter are themselves also made from a composite material (fibres/resin).

Compared with a metal structure, a structure is thus obtained that is more durable, substantially lighter (density of the composite close to 2) and also corrosion resistant.

The fibres of the elementary cylinders may be continuous fibres or short fibres, it is preferred to use continuous fibres. For a better strength of the cylinders, these fibres are more preferably unidirectional and oriented circumferentially in a radial plane (perpendicular to the axis Y).

These elementary cylinders essentially operate by bending. Depending on the circumferential axis of their reinforcing fibres, they have a tensile modulus (ASTM D 638) and a flexural modulus (ASTM D 790) which are preferably greater than 15 GPa, more preferably greater than 30 GPa, especially between 30 and 50 GPa.

The invention also applies to the cases where the two membranes could be constituted of a material, for example made of metal or of a polymer, other than that, composite or not, of the elementary cylinders.

However, according to one preferred embodiment, the inner membrane (14) and outer membrane (16) (known rather as "skins" by a person skilled in the art in the field of composite laminated products) are membranes which are themselves also composites comprising fibres embedded in a resin matrix. Thus, the whole of the base structure of the annular shear band (13), constituted by the two membranes (14, 16), the series (15A, 15B, 15C, etc.) of connecting cylindrical structures and their plurality of elementary cylinders (15a, 15b) is made from a composite material. Preferably, these fibres of the membranes (14, 16) are continuous fibres; more preferably, these continuous fibres are unidirectional, oriented parallel to the main direction X so that the membranes have a maximum tensile strength in the main direction X.

In this direction X, the two membranes or skins have a tensile modulus (ASTM D 638) which is preferably greater than 15 GPa, more preferably greater than 30 GPa (for example, between 30 and 50 GPa).

The connecting cylindrical structures (15) and/or the membranes (14, 16), when they are preferably made of a composite material, may be constituted of a single filamentary layer or of several superposed elementary filamentary layers, the fibres of which are preferably all oriented in the main direction X. Inserted into this multilayer structure may be one or more other additional layers of crossed threads, especially that are oriented along the axis Y (generatrix of the cylinders), in order to reinforce the structure laterally and thus, according to a term recognized in the field of composites, to balance the total structure.

Figure 2:
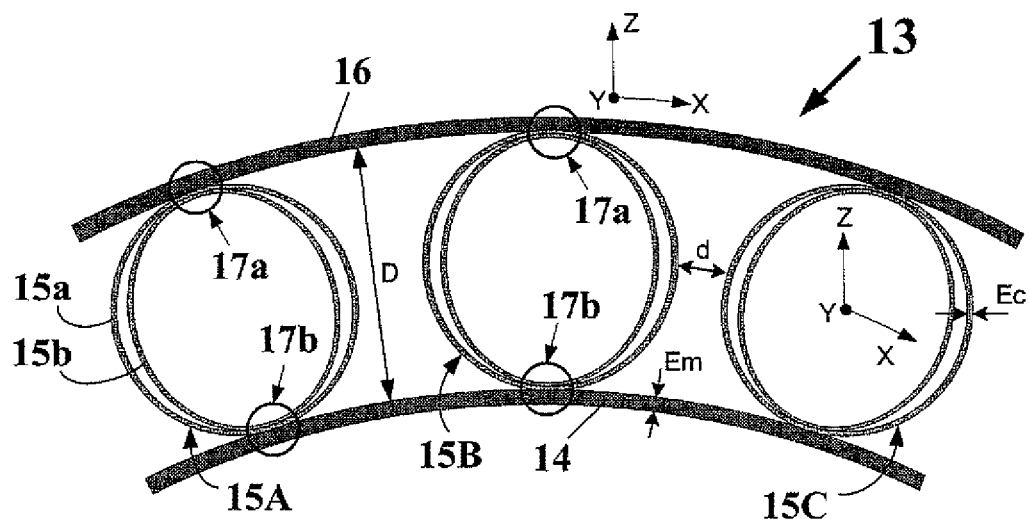
Figure 3:
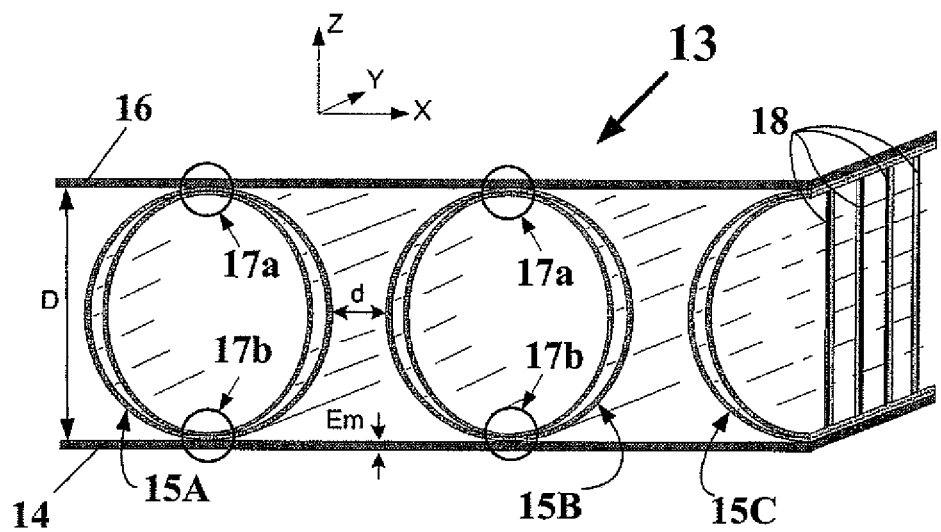

According to another preferred embodiment, the connecting cylindrical structures (15) have from one cylindrical structure to the other, a diameter D (outer diameter or dimension along the axis Z, as shown in FIGS. 2 and 3) which is substantially constant in a direction Z referred to as the radial direction, normal to the direction X and to the axis Y, so as to keep the outer membrane (16) and inner membrane (14) substantially (i.e. approximately) equidistant.

According to another possible embodiment of the invention, the connecting cylindrical structures (15) may also have from one cylindrical structure to the other, a diameter D which is linearly variable in the main direction X, when a structure is desired in which the distance between the two membranes is capable of gradually varying along the main axis X.

As already indicated, as the definition of the elementary cylinders is not limited to cylinders having a circular straight cross section, the term "diameter" should be considered in the present application, broadly, as the dimension of the cylinder (thickness included) measured in the radial direction Z.

The person skilled in the art will know how, as a function of the particular applications targeted, to adjust the particular dimensions of the annular shear band, of the connecting cylindrical structures, of their elementary cylinders and those of the membranes, and their relative arrangement, to the dimensions of the targeted non-pneumatic resilient wheel. The dimension D, for example, makes it possible to adjust the flexural stiffness of the connecting cylindrical structures.

For greater detail, FIG. 2 shows schematically, in cross (or radial) section, a portion of the annular shear band (13) of the wheel (10) of FIG. 1 whereas FIG. 3 gives a schematic perspective view of this same cross section of FIG. 2. In the case of FIG. 3, to simplify the diagram, this portion of the annular shear band has been represented flat (circumferential axis X represented in a rectilinear manner).

An essential feature of the annular shear band (13) is that its connecting cylindrical structures (15A, 15B, 15C, etc.) are non-touching in the circumferential direction (X) so that they can deform and operate by bending.

Preferably, the ratio d/D is between 0.10 and 0.50, d representing the average distance d, measured in the direction X, between two consecutive connecting cylindrical structures, as illustrated in FIGS. 2 and 3. The expression "average distance" is understood to mean an average calculated from all the connecting cylindrical structures (15A, 15B, 15C, etc.) present in the annular shear band (13). If d/D is less than 0.10, there is a risk of being exposed to a certain lack of flexibility in shear of the annular band (13) whereas if d/D is greater than 0.50, a lack of uniformity of the flexural deformation may appear. For these reasons, the ratio d/D is more preferably within a range of around 0.15 to 0.40.

It will be noted, in this regard, that in FIG. 1 commented on earlier, which is very schematic, the connecting cylindrical structures (15) and the wheel spokes (12) have been represented in a relatively reduced number compared to the preferred embodiments of the invention, this for the simple purpose of simplifying the figure.

As preferred examples of possible structures for the annular shear band (13) of the non-pneumatic resilient wheel (10) according to the invention, at least any one, more preferably still all of the following features is (are) met:
  a diameter D which is between 10 and 100 mm;
  an average distance d which is between 1 and 50 mm;
  a width Lm of the membranes and a width Lc of the connecting cylindrical structures, both measured in an axial direction (parallel to the axis Y), which are each between 5 and 200 mm;
  a thickness Em of the membranes (measured in the radial direction Z) which is between 0.25 and 3 mm;
  a thickness Ec of the elementary cylinders (measured for example in the radial direction Z) which is between 0.10 and 3 mm.

These preferred features correspond particularly to the case where the non-pneumatic resilient wheel of the invention has a diameter which is standard for a wheel, for example between 200 and 2000 mm.

More preferably, for the reasons indicated above, at least any one, more preferably still all of the following features is (are) met:
  a diameter D between 15 and 45 mm;
  an average distance d between 1.5 and 40 mm (especially between 3 and 40 mm, more particularly between 5 and 15 mm);
  a width Lm and a width Lc which are each between 20 and 100 mm;
  a thickness Em between 0.5 and 2 mm;
  a thickness Ec between 0.2 and 2 mm.

Of course, values of D of less than 10 mm or greater than 100 mm remain possible depending on the envisaged diameters of the wheels.

Thus, as other examples of possible structures of the annular shear band of the non-pneumatic resilient wheel according to the invention, at least any one, more preferably still all of the following features is (are) met:
  a diameter D between 10 and 100 cm, especially between 15 and 45 cm;
  an average distance d between 1 and 50 cm, especially between 1.5 and 40 cm;
  a width Lm and a width Lc which are each between 5 and 200 cm, especially between 20 and 100 cm;
  a thickness $E_m$ between 0.25 and 3 cm, especially between 0.5 and 2 cm;
  a thickness Ec between 0.10 and 3 cm, especially between 0.2 and 2 cm.

The various constituent parts of the annular shear band (13) of the non-pneumatic resilient wheel (10) of the invention, in particular the connecting cylindrical structures (15) and the inner membrane (14) and outer membrane (16) which constitute the base parts of which, may be connected directly to one another by virtue of chemical, physical or mechanical fastening means. As examples of such direct fastening means, mention will be made, for example, of adhesives, rivets, bolts, staples, and various stitchings or bindings. The mechanical fastening means such as rivets or bolts for example may be made of various materials, such as metal, metal alloy, plastic or else made from a composite (for example based on glass and/or carbon fibres).

For a better anchoring, the connecting cylindrical structures (15) may also partially penetrate into the outer membrane (16) and/or inner membrane (14) to which they are connected.

According to another possible embodiment, the connecting cylindrical structures (15) may be connected indirectly to the outer membrane (16) and inner membrane (14), that is to say by means of intermediate assembly parts. These intermediate parts or "inserts" may have various geometric shapes, for example in the shape of a parallelepiped, a dovetail, in the shape of "I", of "T" or of "U"; they may themselves be fastened to the base parts (membranes and elementary cylinders) by fastening means such as those described above. Use may especially be made of such inserts such as reinforcing parts each time that the forces endured are too high; these inserts possibly lowering the stresses transmitted to the composite structure to acceptable levels. These inserts are, for example, made of metal, metal alloy, plastic or else a composite (for example made of glass and/or carbon fibres embedded in a resin).

In order to prevent a possible risk of rubbing or abrasion, or even of penetration of foreign bodies between adjacent elementary cylinders during dynamic and repeated stresses, it is possible, if necessary, to insert between these elementary cylinders a protective and non-adhesive (with respect to these cylinders) layer of a material, preferably having a very low coefficient of friction so as not to oppose the relative displacement of said adjacent elementary cylinders and having suitable thermal properties, for example a layer of polymer (e.g. a fluoropolymer such as PTFE).

According to one particular embodiment, as represented for example in FIG. 3 for a single one (15C) of the connecting cylindrical structures (in order to simplify the diagram), the connecting cylindrical structures described previously could also be reinforced, for at least some of them, by at least one longilineal reinforcing element (18) referred to a "radial reinforcement" (especially in the form of a monofilament or a tape, for example made of glass/resin composite material) that passes through them completely along their diameter, so as to anchor in the outer membrane (16) and inner membrane (14), parallel to a radial direction Z which is perpendicular to the main direction X and to the generatrix Y of the elementary cylinders.

The radial reinforcements (18) then operate as a beam which can prevent the deformation of the connecting cylinders (15) perpendicular to their axis Y (generatrix). Due to their stiffness in tension and in compression, they can prevent the annular shear band (13) from buckling when the composite structure is subjected to the most severe bending.

Throughout the present description, unless otherwise stated, the term "fibre" applies to any type of reinforcing fibre, that can be used as long as the latter is compatible with its resin matrix. Such a fibre is, for example, chosen from the group constituted by polyvinyl alcohol fibres, aromatic polyamide (or "aramid") fibres, polyamide-imide fibres, polyimide fibres, polyester fibres, aromatic polyester fibres, polyethylene fibres, polypropylene fibres, cellulose fibres, rayon fibres, viscose fibres, polyphenylene benzobisoxazole (or "PBO") fibres, polyethylene naphthenate ("PEN") fibres, glass fibres, carbon fibres, silica fibres, ceramic fibres, and mixtures of such fibres.

Use is preferably made, especially for an application at very low temperature, of the fibres chosen from the group constituted by glass fibres, carbon fibres and mixtures of such fibres. More preferably still, glass fibres are used.

The resin used is a resin which is a preferably thermosetting. It is, for example, a resin that can be crosslinked by ionizing radiation, such as for example UV-visible radiation that emits, preferably in a spectrum extending from 300 nm to 450 nm, a beam of accelerated electrons or of X-rays. A composition may also be chosen that comprises a resin that can be crosslinked by a peroxide, the subsequent crosslinking possibly then being carried out, when the time comes, by means of a heat input, for example by the action of microwaves. Preferably, a composition of the type that can be cured by ionizing radiation is used, the final polymerization possibly being triggered and controlled easily using an ionizing treatment, for example of UV or UV/visible type.

The resin used, in the thermoset state, has a tensile modulus (ASTM D 638) which is preferably at least equal to 2.3 GPa, more preferably greater than 2.5 GPa, especially greater than 3.0 GPa. Its glass transition temperature ($T_g$), measured by DSC, is preferably greater than 130° C., more preferably greater than 140° C.

As a crosslinkable resin, use is more preferably made of a polyester resin (i.e. based on an unsaturated polyester) or a vinyl ester resin.

More preferably still, a vinyl ester resin is used. It has been observed, surprisingly, that a vinyl ester resin survived better than the others at extremely low temperatures. A simple test makes it possible to measure whether the flexural strength of a glass fibre/vinyl ester resin composite is substantially increased at very low temperature. This test consists in making a loop with a composite monofilament (for example having a diameter of 1 mm) and decreasing the radius of curvature until rupture (clearly visible to the naked eye) of the outer part of the monofilament which is in tension. It is then seen, unexpectedly, that the minimum radius achieved becomes smaller when the loop of monofilament has been submerged, just before, in liquid nitrogen (−196° C.). In the thermal quenching or immersion test in liquid nitrogen, it is also possible to test the resin as is, favouring the resins which do not crack during such a test.

According to one particularly preferred embodiment, the annular shear band of the wheel of the invention is entirely constituted of glass and/or carbon fibres, more preferably still glass fibres, embedded in a vinyl ester resin matrix.

Vinyl ester resins are well known in the field of composite materials. Without this definition being limiting, the vinyl ester resin is preferably of the epoxy vinyl ester type.

More preferably, use is made of a vinyl ester resin, especially of the epoxide type, which, at least in part, is based on novolac and/or bisphenol (preferably a novolac, bisphenol or novolac and bisphenol based vinyl ester resin) as described, for example, in applications EP 1 074 369 and EP 1 174 250 (or U.S. Pat. No. 6,926,853). An epoxy vinyl ester resin of novolac and bisphenol type has shown excellent results. By way of example, mention may especially be made of the "ATLAC 590" or "ATLAC E-Nova FW 2045" vinyl ester resins from DSM (both diluted with styrene). Such epoxy vinyl ester resins are available from other manufacturers such as Reichhold, Cray Valley and UCB.

The annular shear band may advantageously be constituted solely of composite parts, in particular made of glass fibres embedded in a vinyl ester resin.

The support elements (12) also known here as "wheel spokes", preferably having a low stiffness in compression, operate in tension to transmit the forces between the annular shear band and the hub (11) of the wheel, as described, for example, in the aforementioned U.S. Pat. No. 7,201,194 (see, for example, FIG. 7 to FIG. 11). Their thickness is typically fine relative to that of the membranes, preferably less than 0.5 mm, more preferably less than 0.3 mm.

Owing to their presence, a uniformly distributed ground contact pressure is favoured, hence a better working of the wheel; thus localized points of high pressure, and the risks of sinking or getting stuck in sand which may go with them on unstable ground, are in particular avoided.

These wheel spokes (12) may be made of materials as diverse as metal (or metal alloys), polymers or else hybrid materials, which are reinforced or non-reinforced. As examples, mention may be made of polymers such as polyurethanes, composite materials comprising fibres, especially glass and/or carbon fibres, impregnated or not with a resin. The tensile modulus of the materials used is suitable, of course, for the load which will be supported by each wheel spoke.

By adjusting the elastic elongability of the wheel spokes (or that of the materials constituting them), it is possible to generate a greater or lesser camber and thus to adjust the ground imprint of the wheel. Thus, preferably, use is made of wheel spokes that have an elastic elongation under tension of a few %, typically of 1 to 5%.

According to one preferred embodiment, especially for use of the wheel at low temperature, it is possible to use wheel spokes which are themselves made of a composite material, such as for example a woven fabric of glass fibres impregnated with PTFE (polytetrafluoroethylene) or layers of continuous, unidirectional glass fibres embedded in a vinyl ester resin matrix, or else a woven fabric of polyester fibres.

For the manufacture of the various composite elements based on fibres and resin that are constituents of the wheel of the invention, whether these are connecting cylinders, where appropriate membranes or radial cylinder reinforcements, it is possible to use any suitable process for manufacturing blocks, sheets, longilineal elements such as monofilaments or tapes. Such processes are widely known today by a person skilled in the art.

Patent application EP 1 174 250 (or U.S. Pat. No. 6,926,853) proposed for example, after degassing, to impregnate a rectilinear arrangement of fibres with the liquid resin, to pass the liquid pre-preg through a die that is calibrated in order to impose, for example, a monofilament shape of round cross section or a shape of a tape, to stabilize the monofilament or tape downstream of the die via a substantial solidification of the resin in a UV stabilization chamber, then to wind the solid (stabilized) tape or monofilament onto a support of suitable shape, finally to cure the whole assembly in a pressurized mould in order to solidify the assembly and guarantee a high shear strength.

Patent application WO 2007/085414 proposed, as an alternative, to directly wind, continuously and in several layers, onto a support that dictates the final shape of the composite block, the fibres embedded in their resin in the liquid state throughout the entire manufacturing operation, for direct formation of a continuous composite block on said support. Once the "liquid" composite is thus formed, the liquid resin is subjected to an at least partial polymerization, for example using UV radiation or a heat treatment in order to stabilize and solidify, at least in part, said composite before separating it from its support. The thus stabilized composite block in which the resin composition is then, at least in part, in the solid phase may then be easily handled, stored as is or treated immediately in order to finish polymerizing the resin (final curing or crosslinking). Thus, the final curing operation may be carried out under simple atmospheric pressure, "out of mould" (or in "open mould" according to the recognized terminology).

For the manufacture of the wheel of the invention, it is possible to use any suitable process for assembling elements described above, for example by adopting the following consecutive steps:

manufacture of the two membranes (14, 16);
positioning of on an assembly jig of connecting cylindrical structures (15A, 15B, 15C, etc.) after initial fitting, in pairs, of the elementary cylinders (15a, 15b);
positioning of lugs (flat "I"-shaped inserts) inside each connecting cylindrical structure (i.e., inside the innermost elementary cylinder) and in each anchoring zone (17a, 17b), said lugs being oriented along the generatrix of said cylinder;
fastening, by bonding (for example using an epoxy adhesive) the two membranes (14, 16), the elementary cylinders (15a, 15b) and the lugs (inserts);
positioning and bonding of the wheel spokes (12);
for example, the spokes are adjusted to the correct length and bonded at their two ends to composite lugs (inserts) one fitted to the inner membrane (14), the other to the metal hub; the lug on the membrane (14) side is both bonded and riveted (or bolted), whereas that on the hub side is only riveted (or bolted);
simultaneous piercing of at least two points of the shear band (membranes, elementary cylinders and lugs);
riveting (or bolting) of the shear band (through membranes, cylinders and lugs) using metal (for example stainless steel) rivets (or bolts), through the above piercing holes.

Preferably, for good effectiveness of the ground contact pressure, the wheel of the invention satisfies the relationship $0.7 \leq Di/De < 1$, more preferably the relationship $0.8 \leq Di/De < 1$, Di being the diameter of the inner circumferential membrane and De being the diameter of the outer circumferential membrane. By way of example, Di and De are within a range of around 200 mm to 2000 mm.

As described previously, the connecting cylindrical structures may be connected directly to the circumferential membranes by virtue of appropriate fastening means already described, or else connected indirectly by means of intermediate assembly parts, especially by virtue of metal, plastic or composite inserts that also have the role of reinforcing the assembly points.

Figure 4:
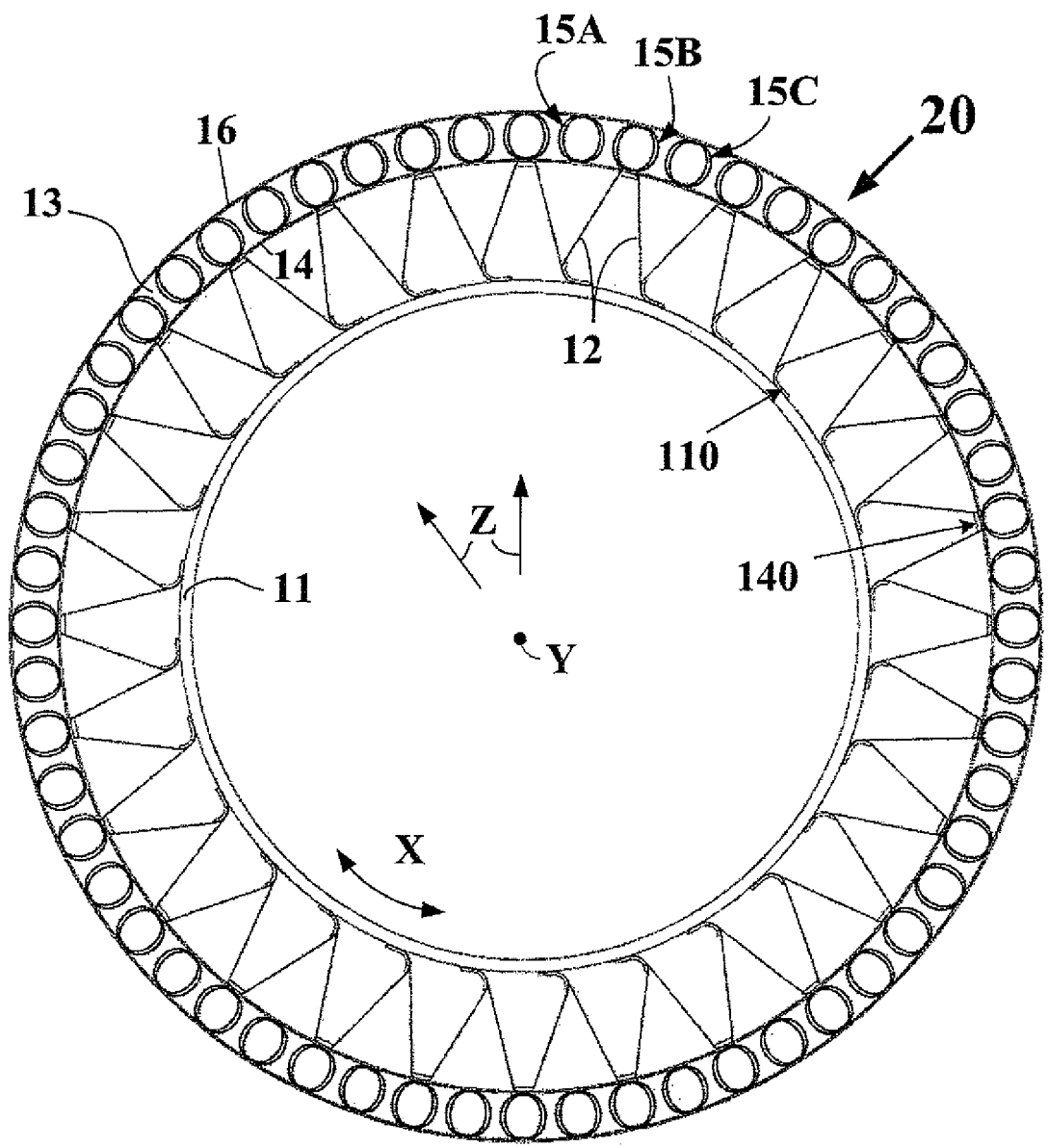
Figure 5:
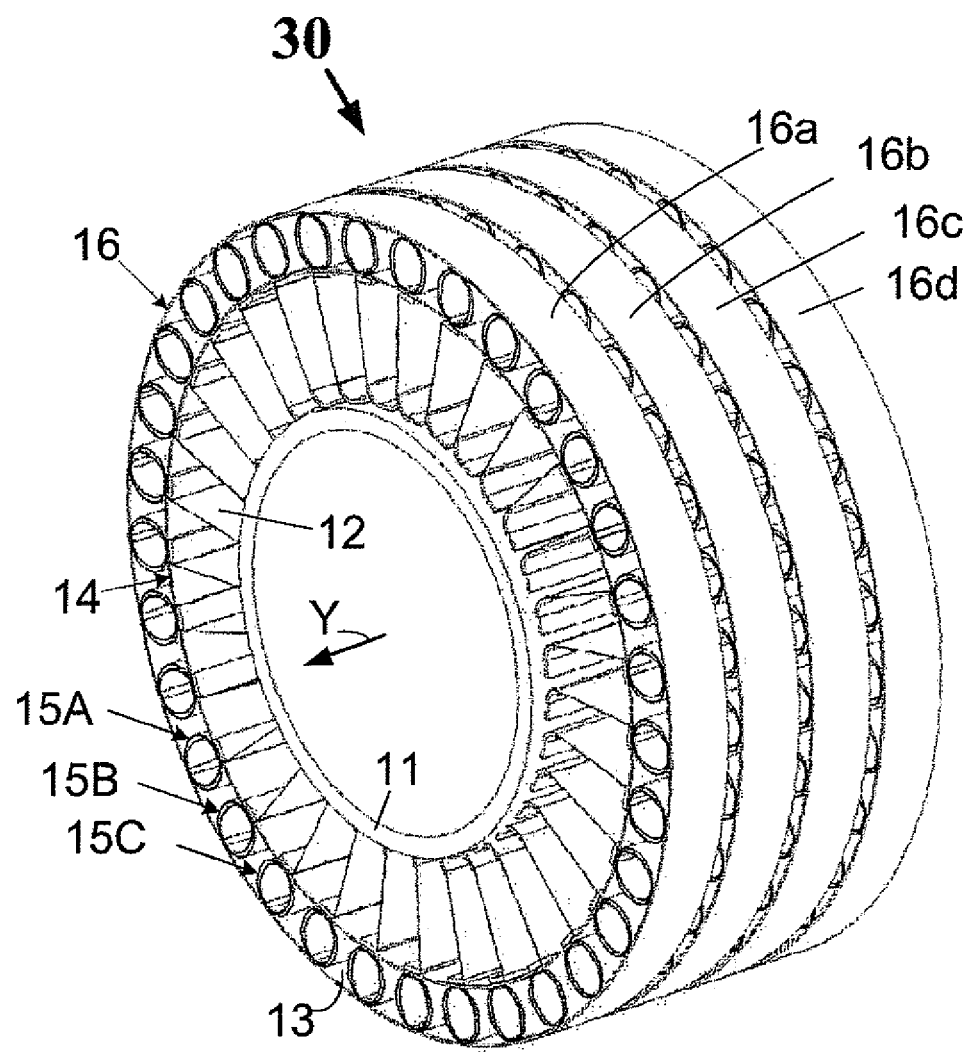

FIGS. 4 and 5 illustrate other examples of a non-pneumatic resilient wheel (20, 30) according to various embodiments.

FIG. 4 schematically shows, in radial cross section, a non-pneumatic resilient wheel (20) in which, in accordance with one particularly preferred embodiment, each connecting cylindrical structure (15A, 15B, 15C, etc) is constituted of two elementary cylinders that are more or less ovoid and that are fitted one inside the other. These two elementary cylinders are both connected, in the anchoring zones, to the inner circumferential membrane (14) and outer circumferential membrane (16), either by direct fastening means (for example, adhesive, rivets or bolts), or by means of intermediate assembly parts; outside of these two anchoring zones these two elementary cylinders are no longer connected to one another in order to be able to operate independently of one another.

Intermediate assembly parts, not represented in this FIG. 4 for the sake of simplification, may consist of flat lugs ("I"-shaped inserts) oriented parallel to the generatrix of the elementary cylinders, positioned (for example bonded or riveted) to the inside of the innermost elementary cylinder (one lug on the side of the outer anchoring zone (17a), another lug on the side of the inner anchoring zone (17b)).

In this FIG. 4, in accordance with one particularly preferred embodiment, each elementary cylinder that is a component of a connecting cylindrical structure (15A, 1513, 15C, etc.) is formed of fibres embedded in a resin matrix.

In this example of a wheel (20), each circumferential membrane (14, 16), having a thickness equal to around 1 mm, is constituted, for example, of two lots of three layers of continuous glass fibres ("Advantex" from Owens Corning; linear density 1200 tex), degassed and impregnated with a vinyl ester resin ("Atlac 590" from DSM+"Irgacure 819" photoinitiator from Ciba) between which a glass fibre well woven fabric ("E" glass; basis weight 125 g/m$^2$), impregnated with a vinyl ester resin, was added in order to balance the composite assembly. The membrane was obtained by filament winding (tape originating from a nozzle of 0.2×5 mm) at an angle close to zero degrees. After winding (laying pitch of 5 mm) of three elementary layers, the winding was stopped, then the resin-impregnated well woven fabric was deposited on the third layer, before winding the last three layers of tape on top of the thus inserted weft woven fabric. Then the whole assembly was polymerized under UV radiation, on the winding support. According to the other method of manufacture, it is possible, for example, to continuously wind, as follows: the following layers are successively deposited: layer at 0°, then a layer at −5°, a layer at +5°, a layer at 0°, a layer at +5°; a layer at −5°; and to finish a layer at 0°, all continuously. The layers at +5° and −5° give sufficient lateral cohesion; the final thickness is always the same. Thus prepared, each membrane has, for example, in the direction of its reinforcing fibres, a tensile modulus of the order of 45 GPa.

The elementary cylinders (15a, 15b) having diameters respectively equal to around 29 and 30 mm and a thickness of around 0.4 mm were prepared as the membranes above, by filament winding in two layers, perpendicular to the axis (generatrix) of the cylinder. After which the whole assembly was polymerized under UV radiation (on the winding support). The connecting cylindrical structures have a diameter D that is constant in the radial direction, so as to keep the outer circumferential membrane (16) and inner circumferential membrane (14) substantially equidistant. In the shear band (13) the average distance d, measured in the circumferential direction X, between two consecutive connecting cylindrical structures (15) is, for example, around 7 mm.

For all the composite elements of the wheel described above, the fibre content is, for example, around 70% (i.e. around 30% by weight of resin.)

In this example of FIG. 4, the wheel spokes (12), having a very fine thickness (around 0.15 mm) are assembled by means of inserts (110, 140), on the one hand to the wheel hub (11) and on the other hand to the inner circumferential membrane (14).

The inserts (110) assembling the wheel spokes (12) to the rigid hub (11) are, for example, in the form of "I" shapes or half "U" shapes, constituted of a composite material (fibres/resin), for example made of glass fibres/vinyl ester resin, having a thickness equal to around 1 mm. They were, for example, manufactured as indicated previously for the elementary cylinders, by filament winding in 5 successive layers onto a support having the shape of a flattened cylinder. After UV polymerization, the half U shapes were obtained by cutting the flattened cylinder. The inserts (140) assembling the wheel spokes (12) to the inner circumferential membrane (14) are, for example, of the same thickness but of smaller size, for example in the shape of an "I" or half "U", themselves made of a composite material such as glass fibres/vinyl ester resin; they were manufactured as indicated previously for the other inserts (110). Due to their bendability, inserts (110, 140) for example in the form of half "U" shapes, may advantageously contribute to the necessary elongation of the wheel spokes (12) during operation of the resilient wheel of the invention, especially when the latter may have insufficient elasticity.

Finally, FIG. 5 shows a perspective view of another example of a non-pneumatic wheel (30), the shear band (13) of which comprises, as it were, several elementary shear bands, placed in parallel radial (i.e. perpendicular to the axial direction Y) planes. It is seen in this FIG. 5 that each elementary outer circumferential membrane (16a, 16b, 16c, 16d) is relatively narrow (axial width equal, for example, to 40 mm, measured along Y) relative to the total axial width of the wheel (for example equal to 200 mm). The inner circumferential membrane (14), barely visible in this view, may itself be constituted of a single or several elementary inner circumferential membrane(s), for example numbering two (for example each having an axial width equal to 80 mm) or four (for example each having an axial width equal to 40 mm).

The elementary shear bands are placed here circumferentially relative to one another in such a way that their connecting cylinders (15) (axial width equal to 40 mm) are substantially aligned from one elementary shear band to the next, in the axial direction Y. Such a configuration gives the wheel greater axial flexibility and may provide an advantageous decoupling for more effectively "absorbing" an obstacle when rolling. However, according to another possible embodiment, the elementary shear bands could be positioned in such a way that their connecting cylinders (15) are positioned in staggered rows in the axial direction Y from one elementary shear band to the next.

A tread, not represented in order to simplify FIGS. 1, 4 and 5, could optionally be added to the wheels of the invention which were described previously, positioned radially on top of the outer circumferential membrane (16) when the latter is not intended for direct contact with the ground during rolling of the non-pneumatic wheel.

This tread may be constituted of materials as diverse as metal (or metal alloys), polymers or else hybrid metal/polymer materials. As examples of polymers, mention may be made, for example, of polyesters such as PET, PTFE, cellulose, such as rayon, rubbers such as diene rubbers or polyurethanes. For use at very low temperature, a tread made of metal, or made of a polymer other than rubber, is preferred.

According to one preferred embodiment, the tread is present in the form of a three-dimensional woven fabric, especially in the aforementioned materials, the thickness of which is, for example, between 5 and 20 mm. According to another preferred embodiment, the leather used as tread, especially with a thickness of a few mm (for example 3 to 4 mm), has proved, surprisingly, to perform particularly well at low temperature.

This tread may be fastened to the shear band of the wheel by various fastening means as described above, for example by bonding or bolting, or even using assembly means such as the inserts described previously. According to another possible embodiment, it could be incorporated directly into the outer circumferential membrane (16) during its manufacture.

In conclusion, the non-pneumatic resilient wheel of the invention is therefore characterized by an annular shear band, the specific structure of which, equivalent to a honeycomb type structure, opens up a very wide range of possible applications for it. This shear band is constituted of elastic materials that retain their properties over a very wide range of temperatures and it is capable of emulating the shear deformation of an elastomer of a shear band as known in the prior art.

The non-pneumatic resilient wheel of the invention can be used in all types of land based or non-land based motor vehicles, in particular vehicles intended to face severe or harsh rolling conditions, or extreme temperatures such as those which could be encountered, for example, by lunar rover vehicles, road transport vehicles, off-road vehicles such as agricultural or civil engineering machines, or any other type of transport or handling vehicles for which the use of an elastomeric material is not possible or is not desired.

The invention claimed is:
1. A non-pneumatic resilient wheel which defines three perpendicular directions, a circumferential direction X, an axial direction Y, and a radial direction, said wheel comprising:
  a hub;
  an annular band referred to a shear band comprising at least one inner circumferential membrane and one outer cir- cumferential membrane that are oriented in the circumferential direction X, the at least one inner circumferential membrane and the one outer circumferential membrane comprise glass fibres embedded in a resin matrix that are unidirectional and oriented parallel to the circumferential direction X, wherein the resin matrix is a thermosetting resin that is a vinyl ester resin; and a plurality of support elements that connect the hub to the at least one inner circumferential membrane, wherein the inner and outer membranes are connected to one another, in zones referred to as anchoring zones, via a series, that extends in the circumferential direction X, of cylindrical structures, referred to as connecting cylindrical structures, that are non-touching in the circumferential direction X, and wherein the connecting cylindrical structures are not connected together in the circumferential direction X; and wherein each connecting cylindrical structure comprises a plurality of elementary cylinders, configured as concentric cylinders, and having their generatrix oriented along the axial direction Y, said elementary cylinders being fitted one inside the other and interconnected to one another in each anchoring zone, wherein the elementary cylinders are composite cylinders comprising glass fibres embedded in the resin matrix, wherein an average distance d, measured in the circumferential direction X, between two consecutive connecting cylindrical structures is such that a ratio d/D is between 0.10 and 0.50, and wherein D is a diameter of the connecting cylinders.

2. The wheel according to claim 1, wherein the fibres are continuous and oriented in the circumferential direction X, in a plane perpendicular to the axial direction Y.

3. The wheel according to claim 1, wherein the fibres of the inner and outer membranes are continuous fibres.

4. The wheel according to claim 3, wherein the continuous fibres of the inner and outer membranes are unidirectional, oriented in the circumferential direction X.

5. The wheel according to claim 1, wherein the diameter D is constant in the radial direction, so as to keep the inner and outer membranes substantially equidistant.

6. The wheel according to claim 1, wherein the diameter D of the connecting cylindrical structures is between 10 and 100 mm.

7. The wheel according to claim 1, wherein a thickness Em of the inner and outer membranes is between 0.25 and 3 mm and a thickness Ec of the elementary cylinders is between 0.10 and 3 mm.

8. The wheel according to claim 1, wherein a thickness Em of the inner and outer membranes, and a thickness Ec of the cylinders are each between 0.25 and 3 mm.

9. The wheel according to claim 1, wherein the connecting cylindrical structures are connected directly to the inner and outer membranes, by virtue of fastening means.

10. The wheel according to claim 1, wherein the connecting cylindrical structures are connected indirectly to the inner and outer membranes, by virtue of intermediate assembly parts.

11. The wheel according to claim 1, further comprising: a tread made of leather.

* * * * *